Dec. 25, 1951 C. E. HALLER ET AL 2,579,820
ULTRAHIGH-FREQUENCY SYSTEM EMPLOYING NEUTRALIZING PROBES
Filed March 18, 1946 4 Sheets-Sheet 1
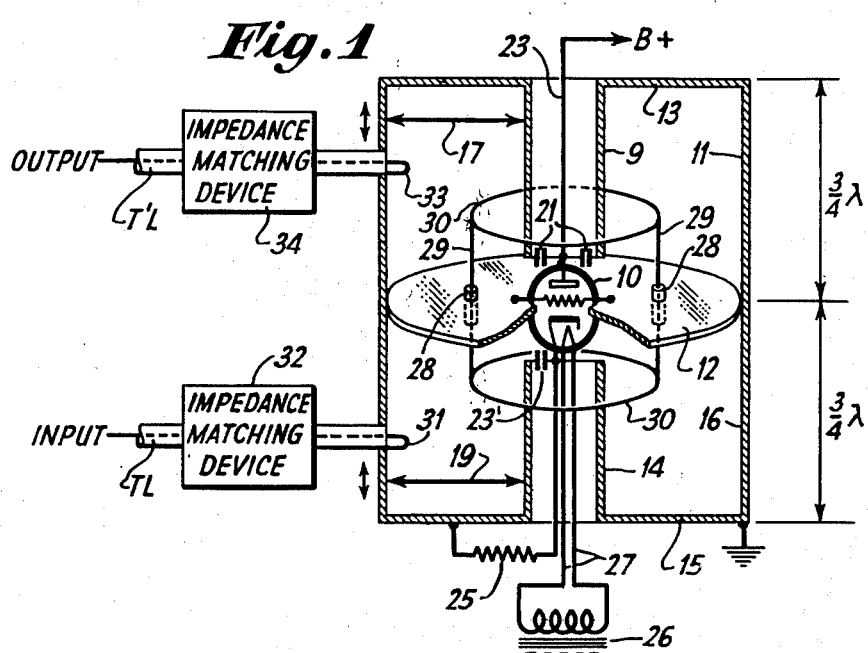
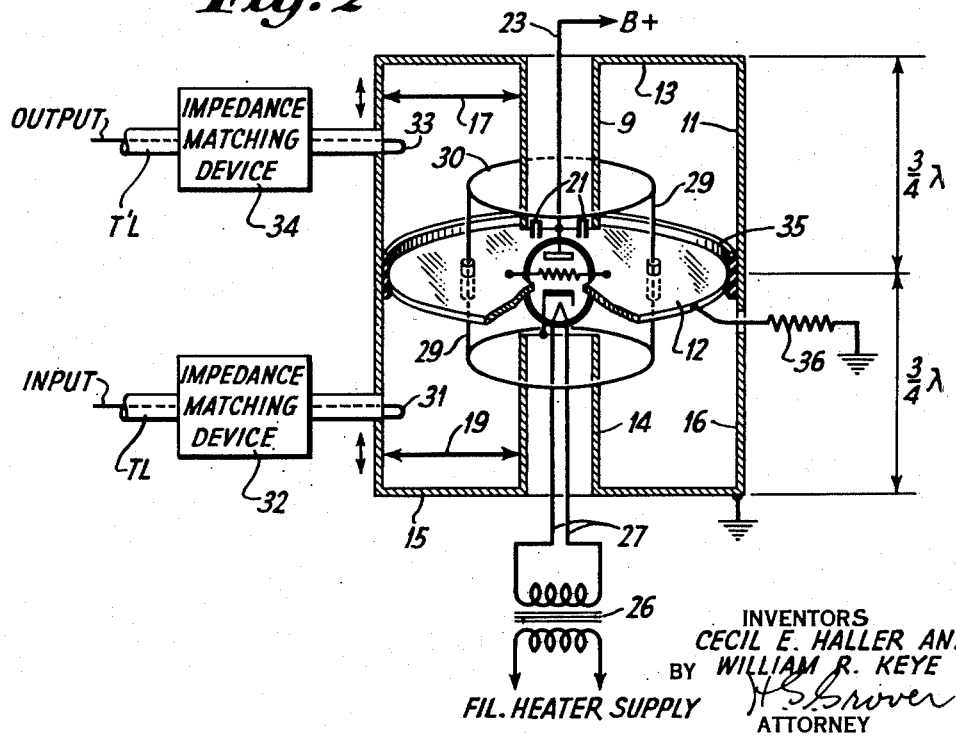
INVENTORS
CECIL E. HALLER AND
BY WILLIAM R. KEYE
ATTORNEY Dec. 25, 1951     C. E. HALLER ET AL     2,579,820
ULTRAHIGH-FREQUENCY SYSTEM EMPLOYING NEUTRALIZING PROBES
Filed March 18, 1946     4 Sheets—Sheet 2
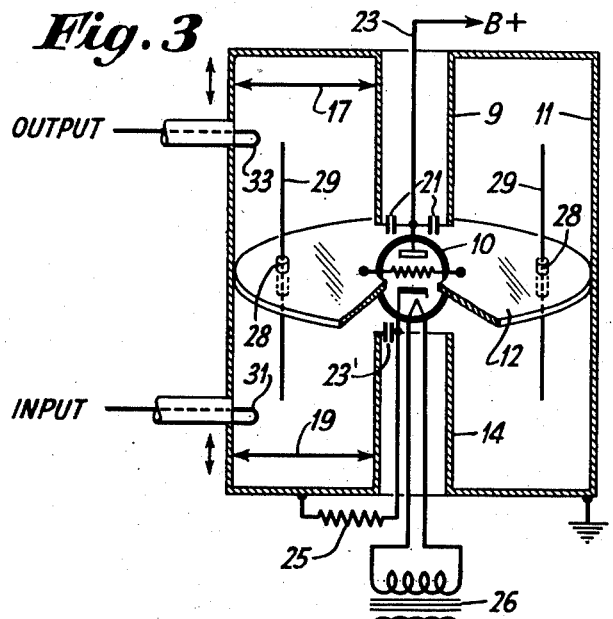
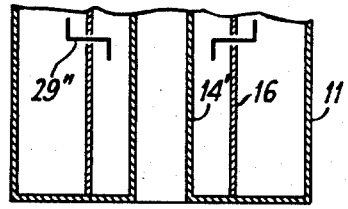
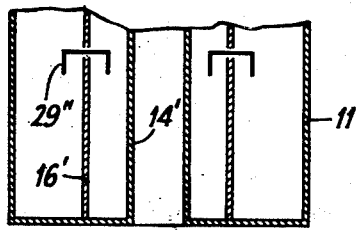
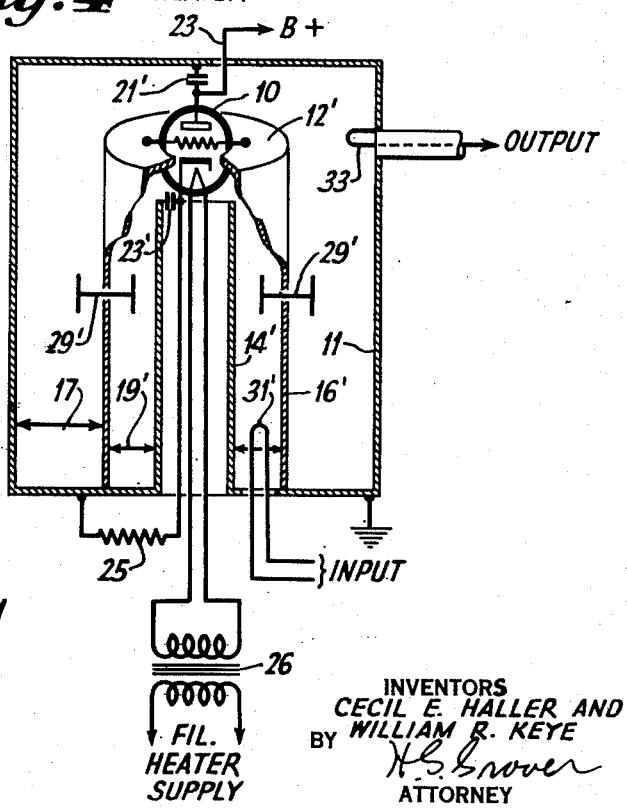
INVENTORS
CECIL E. HALLER AND
WILLIAM R. KEYE
BY
ATTORNEY

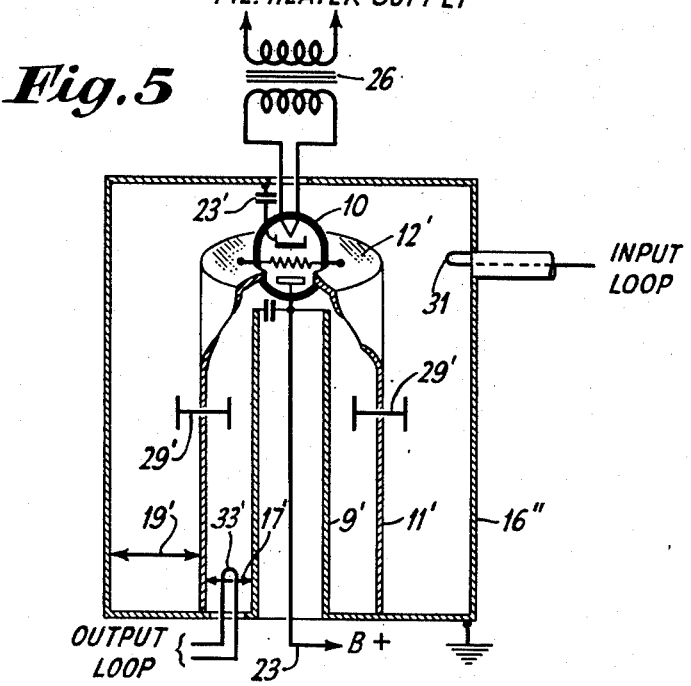
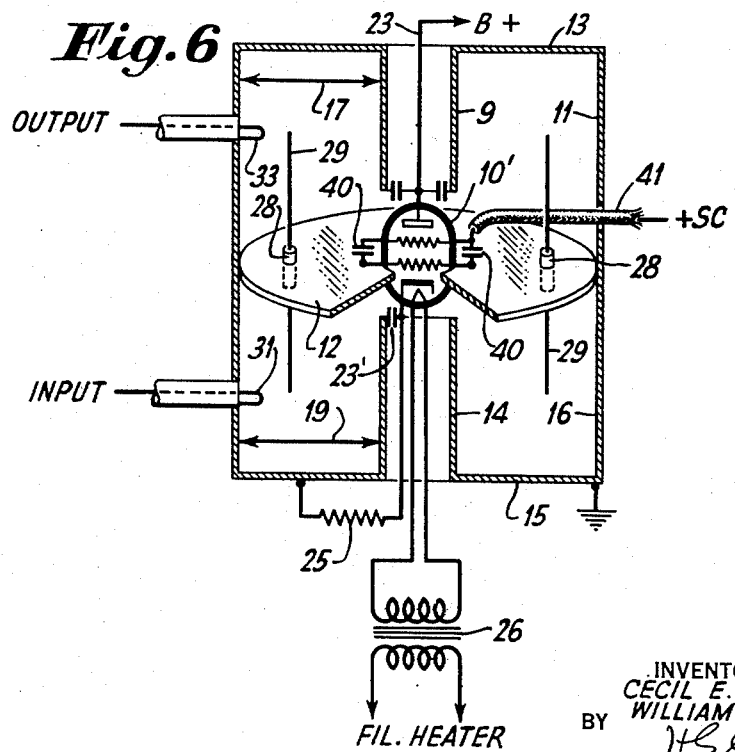

Dec. 25, 1951  C. E. HALLER ET AL  2,579,820
ULTRAHIGH-FREQUENCY SYSTEM EMPLOYING NEUTRALIZING PROBES
Filed March 18, 1946  4 Sheets-Sheet 4
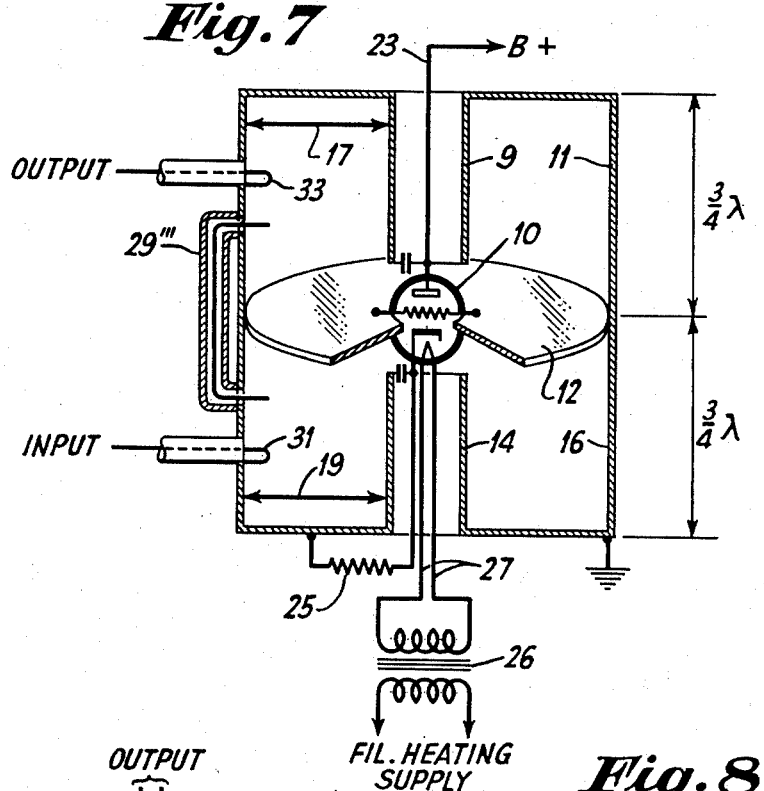
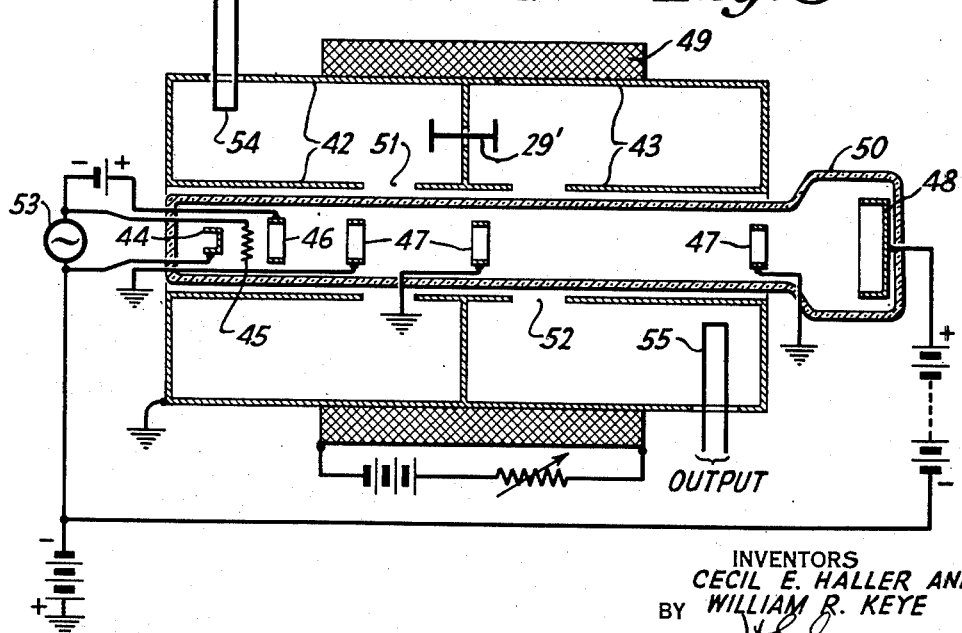
INVENTORS
CECIL E. HALLER AND
BY WILLIAM R. KEYE
ATTORNEY Patented Dec. 25, 1951

2,579,820

UNITED STATES PATENT OFFICE 2,579,820

ULTRAHIGH-FREQUENCY SYSTEM EMPLOYING NEUTRALIZING PROBES

Cecil E. Haller, Lititz, and William R. Keye, Lancaster, Pa., assignors to Radio Corporation of America, a corporation of Delaware Application March 18, 1946, Serial No. 655,060

8 Claims. (Cl. 179—171)

This invention relates to ultra high frequency circuits and particularly to those adapted for use at frequencies of the order of hundreds and thousands of megacycles.

An object of the present invention is to provide a method of and apparatus for neutralizing grounded-grid amplifiers at ultra high frequencies.

Another object is to enable the neutralization of undesired reaction effects between coupled tuned circuits having substantially uniformly distributed inductance and capacitance.

At frequencies of the order of 100 megacycles and lower, grounded-grid triodes have proved to be valuable in amplifier circuits because they are naturally degenerative so that self-oscillation is greatly minimized. At still higher frequencies, for example at the lower limits of the ultra high frequency range, it has been found that there is regeneration present in these grounded-grid amplifiers caused by the anode to cathode interelectrode capacitance. This capacitance can be made to be quite low in triodes, due to the fact that the grid acts as a shield between the plate and cathode. As the frequency is increased, the regeneration due to the anode to cathode capacitance becomes more and more effective and finally this regeneration overcomes the normal degeneration in the grounded-grid amplifier and such amplifier becomes unstable and oscillates. An amplifier circuit which oscillates by itself is not desirable in some cases and a means must be found to prevent this condition.

Since the anode to cathode capacitance is the cause of undesired oscillation in the grounded-grid amplifier, it would seem desirable to reduce this capacitance. Unfortunately, there is a lower limit to this capacitance. To reduce this capacitance still further, it is necessary either to close the open areas of the grid or to move the cathode or anode, or both, further away from the grid. Closing the open areas of the grid results in extreme current absorption by the grid and thus reduces the efficiency of the vacuum tube, while movement of the cathode and anode away from the grid results in increase of electron transit time so that the amplifier tube either operates very inefficiently or not at all.

Other conventional methods of overcoming the oscillation of the grounded-grid amplifier at ultra high frequencies were tried and found to be unsatisfactory. One such method is to introduce losses in the amplifier circuit so that oscillation will not occur. This is wasteful of power. Another conventional method which was tried but found to be unsatisfactory involved the use of a bridged T network formed by the interelectrode capacitance of the vacuum tube and the use of an external neutralizing impedance placed in the grid circuit. At ultra high frequencies, a neutralizing impedance may be either inductive or capacitive in order to balance the positive or negative reactance of the grid circuit to ground. The dimensions of this neutralizing impedance are large and impractical for use at these frequencies. Still another conventional method of neutralizing involves tuning the feed-back capacity to parallel resonance but this last method, it has been found, may be satisfactory only over a very narrow band of frequencies.

The present invention overcomes the foregoing difficulties and provides a method of neutralizing grounded-grid amplifiers over a wide frequency range when used in the ultra high frequency range from 300 megacycles up to thousands of megacycles.

The present invention enables stable amplifier operation over wide band widths of from 100 megacycles to several hundreds of megacycles without any modification of the neutralizing circuit.

The grounded-grid amplifier of the present invention employs separate tuned circuits for the cathode and the anode. These tuned circuits are preferably in the form of coaxial resonant transmission lines, although other types of resonant chambers might be employed; for example, cavity resonators. A feed-back circuit is employed between the anode tuned circuit and the cathode tuned circuit so as to neutralize the power fed directly through the vacuum tube due to the interelectrode capacitance. The constants of the feed-back circuits are so chosen that the regeneration effect due to interelectrode capacitance of the vacuum tube can be completely neutralized in order to obtain normal degeneration, inherent in the grounded grid amplifier, or so chosen that there is a slight degree of regeneration but not sufficient to cause oscillation. The amount of feed-back is preferably equal and opposite to that due to the anode-to-cathode capacitance. This feed-back circuit is so designed to have phase reversing properties.

The preferred form of neutralizing circuit employed in the grounded-grid amplifier of the present invention is a transmission line or lead, or a plurality of transmission lines or leads, each of which has an electrical length substantially equal to one-half the length of the operating wave at the mean frequency of operation. These transmission lines are high surge impedance half-wave lines and they serve to reduce feedback due to the interelectrode capacitance to a point or value below that necessary for oscillation. Depending upon the exact constants of these neutralizing lines or leads, there is obtained in accordance with the invention a wide degree of neutralization. The desired degree of neutralization will depend upon the use to which the grounded-grid amplifier may be put.

The present invention is based upon and utilizes the following three principles:

First, the neutralizing transmission lines or leads should be as short as possible consistent with the phase requirements. This may be understood from the fact that if one or more transmission lines are used to feed back energy from the plate to the cathode circuit, the phase will change with the electrical length of the line or lines. If the line were N wavelengths long and the frequency changed until $N+1$ wavelengths were accommodated, the phase of the feed-back would have changed through 360°. If L is the length of the line in centimeters, then the wavelength $\lambda 1$ is defined as $$\lambda 1 = \frac{L}{N}$$

Similarly at the new frequency, $$\lambda 2 = \frac{L}{N+1}$$

and $\Delta \lambda$ the change in wavelength to produce a 360° phase shift becomes $$\Delta \lambda = \lambda 1 - \lambda 2 = \frac{L}{N^2 + N} = \frac{L}{N(N+1)}$$

This equation shows that the change of wavelength required to produce a change of phase decreases as N increases.

Second, high surge impedance neutralizing lines are necessary to secure greatest band width. It can be shown that the band width of a transmission line is inversely proportional to the Q. It can also be shown that above a certain specified value of surge impedance ($Z_0$) for coaxial lines, the Q decreases with an increase in $Z_0$ when the size of the outer conductor is held constant.

Third, the neutralizing feed-back circuit should be approximately one-half wavelength long electrically at the mean operating frequency in order to oppose the tube interelectrode feed-back, if the terminations in the cathode and anode tuned circuits are at points of similar phase. This is because the one-half wavelength neutralizing line or lead possesses phase inverting properties. From a practical aspect, the mechanical length may be greater or smaller than the electrical one-half wavelength depending upon the effective termination of the neutralizing lines.

A consideration of the foregoing principles upon which the invention is based shows that a wide band neutralization scheme can be achieved by the use of an approximately one-half wavelength high impedance neutralizing transmission line. These neutralizing transmission lines may be made into probes extending one-quarter of a wavelength into each of the respective resonant chambers, thus giving a total overall electrical length of one-half wavelength for each probe.

Obviously, although a half wavelength high surge impedance transmission line is necessary in order to achieve wide band neutralization in the grounded-grid amplifier, it should be understood that the electrical length of the neutralizing transmission line could be a multiple of one-half wavelength at the mean operating frequency; for example, two half wavelengths long.

A more detailed description of the invention follows in conjunction with the drawings, wherein:

Figs. 1, 2, 3, 4 and 5 diagrammatically illustrate different embodiments of a grounded grid-triode vacuum tube amplifier utilizing anode and cathode tuned circuits having uniformly distributed inductance and capacitance for use in the ultra high frequency range;

Fig. 6 diagrammatically illustrates another embodiment of a grounded grid amplifier of the invention wherein use is made of a screen grid vacuum tube;

Fig. 7 diagrammatically shows still another embodiment of a grounded grid amplifier in accordance with the invention, which differs primarily from Figs. 1 to 5 in employing a neutralizing line or probe between the anode and cathode tuned circuits, a portion of which is externally located relative to the tuned circuits; and Fig. 8 illustrates the use of a neutralizing line or probe between the two cavity or coaxial line resonators in order to neutralize the reaction between the two resonant chambers.

Throughout the figures of the drawing, the same parts are represented by the same reference numerals, while equivalent parts are represented by the same reference numerals with prime designations.

Referring to Fig. 1 in more detail, there is shown an ultra high frequency grounded grid amplifier circuit comprising a vacuum tube 10 mounted in and supported by a metallic plate 12. This plate 12 is shown partially broken away to more clearly show the vacuum tube elements, although actually the plate is a complete circular disc. The grid of the tube 10 is directly connected to this metallic plate, as shown. The anode tuned circuit comprises a coaxial line resonator having a hollow inner conductor 9 and a surrounding outer conductor 11 directly connected to the inner conductor 9 by means of an end plate 13. The cathode tuned circuit comprises another coaxial line resonator having a hollow inner conductor 14 and a surrounding outer conductor 16 directly connected to the inner conductor by a metallic plate 15. These coaxial line tuned circuits are separately tuned by means of metallic sliders 17 and 19 which contact the outer surface of the inner conductor and the inner surface of the outer conductor. Each slider in practice comprises an annulus but is herein illustrated as a straight line in order to simplify the drawing. The sliders slide along the lengths of the inner conductors in order to vary the resonant frequency of their respective coaxial line resonators. The outer conductors of the two coaxial lines are grounded, as shown, and may constitute extensions of one another, if so desired. The effective length of each coaxial line resonator is three-quarters of a wavelength at the mean operating frequency, with approximately one-quarter of this three-quarter wavelength within the vacuum tube itself. It will thus be seen that the vacuum tube aids to increase the electrical length of the line, although shortening the mechanical length of the coaxial line resonator.

The anode is by-passed to the inner conductor 9 of the anode coaxial line by means of by-passing condensers 21, and this anode is connected through a conductor 23 extending within the inner conductor 9 to the positive terminal of a source of unidirectional anode polarizing potential B+. The cathode is by-passed to the inner conductor 14 of the cathode tuned circuit by means of a by-pass condenser 23', and this cathode is connected through a lead passing through the interior of the hollow conductor 14 to a cathode bias resistor 25, one end of which is grounded to the end plate 15. Filament heating current is supplied over low frequency iron core transformer 26 to the filament leads 27 which pass through the interior of the inner conductor 14 to the filament of the tube 10.

A pair of neutralizing probes or transmission lines 29, 29 (each substantially one-half wavelength long at the mean operating frequency) passes through the metallic plate 12 for neutralizing the energy fed through the vacuum tube due to the anode-cathode interelectrode capacitance. These neutralizing lines have high surge impedance so as to reduce the Q and may be in the form of wires, ribbons, metallic rods, or hollow metallic tubes. As mentioned previously, this interelectrode capacitance tends to cause regeneration. The neutralization provided by the probes or transmission lines 29, 29 reduces this regeneration due to the interelectrode capacitance to a point or value below that necessary for oscillation. It should be noted that each neutralizing lead or line 29 is supported by an insulating bead 28 mounted in a small aperture in the grounded plate 12.

The probes have such dimensions as to make them high surge impedance lines. By making the probe diameters small with respect to the space between the inner and outer conductors of the anode and cathode coaxial line resonators, the high surge impedance lines or probes are obtained.

Connected to the ends of the neutralizing leads or transmission lines 29, 29 are wire rings 30 which surround the inner conductor and serve to load the neutralizing lines 29, 29. These wire rings furnish a capacitance effect at the ends of the neutralizing lines 29, thereby mechanically shortening the length of the lines 29, 29. The wire rings 30, 30 also tend to increase the coupling between the anode and cathode coaxial line resonators. As will be described later, these wire rings 30, 30 may be omitted and the same neutralizing effect achieved by suitably choosing the lengths and dimensions of the neutralizing transmission line. As mentioned above, each neutralizing line as loaded by its wire ring is electrically one-half wavelength at the mean operating frequency. The voltage curve on each neutralizing line 29 is such that there is a reversal in phase between both ends of each line 29 and there is a voltage nodal point at the grid ground plane 12. Depending upon the loading of the neutralizing transmission line or leads 29, 29, the length of that portion of the neutralizing line in one input (cathode) or output (anode) coaxial line resonator can be different from the length of the portion of this same neutralizing line in the other output (anode) or input (cathode) coaxial line resonator. In all cases, however, there is a voltage nodal point or a current maximum point at or near the grid ground plane 12, thus reducing to a minimum any stress which may otherwise be placed on the insulating beads and supports 28 which serve to support these neutralizing leads and through which the neutralizing leads pass.

In Fig. 1 the two neutralizing leads or probes 29, 29 are such that they extend for one-quarter wavelength into both the anode and cathode coaxial line resonators. The constants of the neutralizing transmission lines can be so chosen or adjusted that the regeneration effect caused by the interelectrode capacitance can be completely neutralized to obtain normal degeneration in the amplifier, or so chosen that there is a slight degree of regeneration but not sufficient to cause oscillation. Putting it in other words, the invention permits a wide latitude of neutralization, and the desired degree of neutralization will depend upon the use to which the amplifier may be put.

The input circuit for the grounded grid triode amplifier of Fig. 1 is shown as comprising a coaxial line TL to which ultra high frequency driving energy is supplied. This line TL is coupled to the interior of the cathode coaxial line resonator 14, 16 by means of a suitable loop or probe 31 through an impedance matching device 32. Device 32 may be a double stub tuner and such a stub tuner was actually employed in one embodiment of the invention successfully tried out in practice. Output from the resonator is derived from a suitable probe or loop 33 entering the interior of the anode coaxial line resonator 9, 11. This loop 33 is fed to a suitable coaxial line T'L through an impedance matching device 34. Impedance matching device 34 may also be a double stub tuner. Output line T'L may extend to any suitable utilization circuit, such as an antenna (for example).

The input and output probes or loops 31, 33 are positioned at the first voltage maximum points from the short circuited ends of the coaxial line resonators in order not to distort the electromagnetic fields existing near the neutralizing leads or lines 29.

In one embodiment of the invention utilizing a grounded grid amplifier in accordance with Fig. 1, the vacuum tube employed was an A-2214B type of ultra high frequency triode tube. Stable amplifier operation was achieved in the range of 500 to 1000 megacycles with a bandwidth of at least 100 megacycles.

Fig. 2 is a modification of the system of Fig. 1 and is substantially identical therewith except for the use of a grid-leak bias rather than the cathode bias of Fig. 1. It should be noted that the grid ground plate 12 is now by-passed to ground via a mica insulator 35 and that the plate 12 is connected to ground through a grid leak resistor 36. The cathode is directly connected to the adjacent end of inner conductor 14 of the cathode coaxial line resonator.

It should be understood that throughout the figures of the drawing it is immaterial whether grid leak or cathode bias is employed in constructing a grounded-grid amplifier in accordance with the invention.

Fig. 3 is a modification of the circuit of Fig. 1 and differs therefrom essentially in the omission of the wire rings 30 from the neutralizing leads or lines 29. Here again the neutralizing lines 29 are each one-half wavelength at the mean operating frequency. Although two neutralizing leads or lines 29, 29 have been shown, it should be understood that under certain conditions a single neutralizing line 29 may be used. Likewise, the number of neutralizing lines 29 may be increased to several, the more neutralizing lines being used the greater being the effective capacity and the narrower the band width of operation of the grounded-grid amplifier, and also the greater the feed back due to the neutralizing lines.

Fig. 4 shows another embodiment of the invention in which the outer conductor 16' of the cathode coaxial line resonator 14', 16' constitutes the inner conductor of the anode coaxial line resonator 16', 11. Because of the fact that the anode and cathode coaxial line resonators of Fig. 4 tend to differ greatly from one another in length and surround one another, it will be evident that the system of Fig. 4 is a more compact construction than those of Figs. 1, 2 and 3 wherein the two coaxial line resonators are arranged end-to-end.

In Fig. 4 the grid of the tube 10 is grounded to the metallic plate 12' which shields the anode and cathode coaxial line resonators from each other. The cathode of the tube 10 is by-passed to the inner conductor 14 of the cathode resonator by means of a by-pass condenser 23'. The anode of the tube 10 is supplied with anode polarizing potential B+ over lead 23 and is by-passed to ground via condenser 21'.

The short-circuiting slider for tuning the cathode coaxial line resonator is designated 19' and is provided with an aperture in its center for accommodating a loop or probe 31' for supplying ultra high frequency input energy to the coaxial line resonator. The output loop or probe 33 derives output energy from the anode coaxial line resonator. Both of the loops 31' and 33 are located at such points as not to disturb the electromagnetic fields near the neutralizing transmission lines for probes 29', 29'. As mentioned above in connection with the other figures, these sliders in practice are each annular in form.

The conductor 16' forming a common wall for both the cathode and anode coaxial line resonators is provided with apertures at a suitable location intermediate its ends for enabling two neutralizing high impedance lines or probes 29', 29', each electrically one-half wavelength long at the mean operating frequency, to pass through the apertures, thus coupling the anode and cathode resonators together. These probes 29' are shown with capacitor end tabs which may be wires or small plates. In practice, one or more of these neutralizing probes may be employed, depending on the conditions under which the amplifier is to be used. The tabs on the end of the one-half wavelength neutralizing lines serve to load these probes and to reduce the mechanical length thereof.

Figs. 4a and 4b show how the neutralizing probes of Fig. 4, now designated 29", can have different configurations for achieving the same result. In Fig. 4a, the probes are substantially S-shaped, whereas in Fig. 4b the probes 29" have ends which are folded back. In both cases, the overall electrical length of each of these probes or neutralizing lines is electrically one-half wavelength long at the means operating frequency.

Except for the differences in the configuration of the neutralizing probes of Figs. 4a, 4b, the amplifier circuits of these two figures are identical with that of Fig. 4. Figs. 4a and 4b have been shown in fragmentary form in order not to include details of the circuit which are shown in Fig. 4 and thus detract from the simplicity of the drawing.

The location of these probes in Figs. 4, 4a and 4b is such that there is obtained the proper phase or amplitude of feed back, and these factors will vary with different vacuum tubes and different amplifier circuits.

Fig. 5 shows a neutralized grounded-grid amplifier circuit which is similar to that of Fig. 4 but differing therefrom essentially in interchanging the anode and cathode electrodes. It will be seen that the anode coaxial line resonator of Fig. 4 comprises the inner conductor 9' and the surrounding conductor 11', while the cathode tuned circuit comprises the common conductor 11' and the surrounding outer conductor 16". The cathode is connected to ground via by-pass condenser 23'. Input driving energy is supplied to the cathode coaxial line resonator 11', 16' through input probe or loop 31. Short-circuiting sliders 19' and 17' serve to tune the cathode and anode coaxial line resonators, respectively. The short-circuiting slider 17' is provided with an aperture through which passes a loop or probe 33' for deriving output energy from the anode resonator. Fig. 5, like Fig. 4, is provided with neutralizing probes or lines 29'.

Fig. 6 illustrates a modification of the system of Fig. 3 in which a neutralized grounded-grid tetrode tube 10' is employed. The control grid of tube 10' is directly connected to the ground plate 12, while the screen grid is by-passed to the ground plate 12 for radio frequency energy by means of the by-pass condensers 40. A shielded screen grid lead 41 serves to supply a suitable positive potential to the screen grid of the tube 10'. This shielded lead 41 may, if desired, be positioned below the surface of the ground plate 12 in a suitable slot or aperture thereof, provided that the plate 12 is given sufficient thickness.

Fig. 7 is a modification of the system of Fig. 1 and illustrates how an externally located shielded feed back line 29''' may be used to neutralize the energy fed through the tube due to the anode-cathode interelectrode capacitance. The overall electrical length of line 29''' including the probes which extend into the interior of the anode and cathode coaxial resonators, is preferably one-half wavelength at the mean operating frequency, although it may be an odd integral multiple, greater than unity, of one-half wavelength long at the mean operating frequency, in order to obtain phase reversing properties at the two ends of the neutralizing line. It is preferred that the line be exactly one-half wavelength long at the mean operating frequency in order to obtain maximum band width of amplifier operation. Any departure from a single one-half wavelength overall length is at the expense of bandwidth In the system of Fig. 7, employing the externally located shielded feed back neutralizing line 29''', only the relative phase of the energy at the two ends of the line 29''' effect neutralization; in contrast to the use of the internal lines of Figs. 1 through 6, wherein the entire length of the neutralizing line is utilized for this purpose.

Fig. 8 illustrates the use of a neutralizing probe 29' between two coaxial line resonators 42 and 43, in order to neutralize undesired reaction between the two resonators. The electrical length of the neutralizing line or probe 29' is one-half wavelength long at the mean operating frequency. The system of Fig. 8 is an amplifier arrangement wherein two quarter wave concentric line tanks 42 and 43 are arranged end-to-end in cascade so that a single electron beam from a cathode 44 traverses the lengths of the inner conductors of both resonators to excite them in succession. The vacuum tube comprises an elongated glass envelope 50 which extends through the inner conductors of the two coaxial line resonators.

Within the envelope 50 there are provided a cathode 44, a grid 45, an electrostatic focusing electrode 46, suitable electrodes 47 maintained at a positive potential relative to the cathode in order to accelerate the electrons, and an electron collector electrode 48. A field coil 49 serves to focus the electron stream and this coil together with the electrostatic focusing electrode 46 prevents the electron stream from impinging on the sides of the evacuated glass envelope 50. The two coaxial line resonators 42 and 43 are placed end to end and are provided with gaps 51 and 52 across which the electron stream passes. A suitable source of carrier oscillations 53 is connected between the cathode 44 and the grid 45 for breaking the electron beam into a series of groups of electrons. These spaced groups of electrons deliver high frequency power to the concentric line resonators 42 and 43. Individual output circuits 54 and 55 are provided for the two concentric line resonators 42 and 43, although, if desired, these two outputs can be combined in a single circuit in known manner to provide an amplified output, in which case both tank circuits 42 and 43 should have identical dimensions.

The system of Fig. 8 is merely illustrative of any suitable system employing coaxial line or cavity resonators positioned such that there is reaction between them, with a neutralizing probe or line 29' in accordance with the invention in order to overcome the undesired reaction between the two resonators. Obviously, such a system may employ torroidal cavity resonators (such as in the Klystron system) or other types of cavity resonators. If desired, the system of Fig. 8 can be modified for use with frequency modulation or phase modulation systems employing a pair of adjacent cavity resonators, in the manner described in connection with Fig. 3 of United States Patent 2,280,026, granted to Charles H. Brown. A neutralizing probe or line would be provided in accordance with the invention to neutralize undesired reaction between the two cavity resonators by means of a transmission line one-half wavelength long at the operating frequency.

The term "ground" employed in the specification and claims is deemed not to be limited to an actual earth connection but to include any point of reference potential which may be fixed or at zero radio frequency potential.

What is claimed is:

1. In an ultra high frequency amplifier system adapted to operate over a relatively wide band of frequencies, a vacuum tube having a grid, an anode and a cathode, individual tunable resonators for said anode and cathode, a ground plate directly connected to said grid and shielding said resonators from each other, and a neutralizing probe of low Q having an electrical length equal to one-half the length of the operating wave at the mean operating frequency coupling said resonators together, said probe passing through an aperture in said ground plate and being insulated therefrom, said probe being so arranged that there is a voltage nodal point thereon at or near said ground plate, said resonators each comprising a concentric line resonator whose inner and outer conductors are short-circuited for radio frequency energy at the end farthest away from said vacuum tube, the electrical length of each resonator as loaded by said vacuum tube being three-quarters of the length of the operating wave at the mean operating frequency, and input and output probes entering the interiors of said cathode and anode resonators, respectively, at the first voltage maximum point from the short-circuited ends.

2. In an ultra high frequency amplifier system adapted to operate over a relatively wide band of frequencies, a vacuum tube having a grid, an anode and a cathode, individual tunable resonators for said anode and cathode, a ground plate directly connected to said grid and shielding said resonators from each other, an a neutralizing probe of low Q having an electrical length equal to one-half the length of the operating wave at the mean operating frequency coupling said resonators together, said probe passing through an aperture in said ground plate and being insulated therefrom, said probe being so arranged that there is a voltage nodal point thereon at or near said ground plate, said resonators each comprising a concentric line resonator whose inner and outer conductors are short-circuited for radio frequency energy at the end farthest away from said vacuum tube, the electrical length of each resonator as loaded by said vacuum tube being three-quarters of the length of the operating wave at the mean operating frequency, and input and output probes entering the interiors of said cathode and anode resonators respectively, at the first voltage maximum point from the short circuited ends, said neutralizing probe having wire rings at both ends for capacitively loading the probes and shortening the mechanical length of said probes.

3. In an ultra high frequency amplifier system adapted to operate over a relatively wide band of frequencies, a vacuum tube having a grid, an anode and a cathode, individual tunable resonators for said anode and cathode, a ground plate directly connected to said grid and shielding said resonators from each other, and a feed-back circuit of low Q coupling said resonators together, said feed-back circuit comprising a plurality of neutralizing probes of low Q each having an electrical length equal to one-half the length of the operating wave at the mean operating frequency, said probes passing through an aperture in said ground plate and being insulated therefrom, said probes being so arranged that there is a voltage nodal point thereon at or near said ground plate, said resonators each comprising a concentric line resonator whose inner and outer conductors are short-circuited for radio frequency energy at the end farthest away from said vacuum tube, the electrical length of each resonator as loaded by said vacuum tube being three-quarters of the length of the operating wave at the mean operating frequency, and input and output probes entering the interiors of said cathode and anode resonators, respectively, at the first voltage maximum point from the short-circuited ends.

4. In an ultra high frequency amplifier system adapted to operate over a relatively wide band of frequencies, a vacuum tube having a grid, an anode and a cathode, individual tunable resonators for said anode and cathode, a ground plate directly connected to said grid and shielding said resonators from each other, and a feed-back circuit of low Q coupling said resonators together, said feed-back circuit comprising a plurality of neutralizing probes of low Q having an electrical length equal to one-half the length of the operating wave at the mean operating frequency, said probes passing through an aperture in said ground plate and being insulated therefrom, said neutralizing probes having wire rings at both ends for capacitively loading the probes and shortening the mechanical length of said probes, said probes being so arranged that there is a voltage nodal point thereon at or near said ground plate, said resonators each comprising a concentric line resonator whose inner and outer conductors are short-circuited for radio frequency energy at the end farthest away from said vacuum tube, the electrical length of each resonator as loaded by said vacuum tube being three-quarters the length of the operating wave at the mean operating frequency, and input and output probes entering the interiors of said cathode and anode resonators, respectively, at the first voltage maximum point from the short-circuited ends.

5. In an ultra high frequency amplifier system adapted to operate over a relatively wide band of frequencies, a vacuum tube having a grid, an anode and a cathode, individual tunable resonators for said anode and cathode, a conductive wall portion common to said individual resonators directly connected to said grid and shielding said resonators from each other, a feed-back circuit coupling said resonators together, said feed-back circuit comprising a plurality of neutralizing probes each having an electrical length equal to one-half the length of the operating wave at the mean operating frequency, said probes passing through an aperture in said common wall portion and being insulated therefrom, said probes being so arranged that there is a voltage nodal point thereon at or near said common wall portion, said resonators each comprising a concentric line resonator whose inner and outer conductors are short-circuited for radio frequency energy at the end farthest away from said vacuum tube, the electrical length of each resonator as loaded by said vacuum tube being three-quarters of the length of the operating wave at the mean operating frequency, and input and output probes entering the interiors of said cathode and anode resonators, respectively.

6. An ultra high frequency amplifier system in accordance with claim 5 in which said individual tunable resonators comprise coaxial line resonators one within the other, and said common wall portion forms the outer conductor for the inner coaxial line resonator and the inner conductor for the outer coaxial line resonator.

7. An ultra high frequency amplifier system in accordance with claim 5 in which said individual tunable resonators comprise coaxial line resonators one within the other, said common wall portion forms the outer conductor for the inner coaxial line resonator and the inner conductor for the outer coaxial line resonator, and said anode is connected over a low impedance path for radio frequency energy to said outer resonator, and said cathode is connected over a path of low impedance for radio frequency energy to the inner conductor of the inner resonator.

8. An ultra high frequency amplifier system in accordance with claim 5 in which said individual tunable resonators comprise coaxial line resonators one within the other, said common wall portion forms the outer conductor for the inner coaxial line resonator and the inner conductor for the outer coaxial line resonator, and said cathode is connected over a low impedance path for radio frequency energy to said outer resonator, and said anode is connected over a path of low impedance for radio frequency energy to the inner conductor of the inner resonator.

CECIL E. HALLER.
WILLIAM R. KEYE.

REFERENCES CITED

The following references are of record in the file of this patent:

UNITED STATES PATENTS

| Number | Name | Date |
| --- | --- | --- |
| 2,169,396 | Samuel | Aug. 15, 1939 |
| 2,235,414 | White | Mar. 18, 1941 |
| 2,282,856 | Engbert | May 12, 1942 |
| 2,297,512 | Von Baeyer | Sept. 29, 1942 |
| 2,339,223 | Haeff | Apr. 30, 1946 |
| 2,400,753 | Haeff | May 21, 1946 |
| 2,404,261 | Whinnery | July 16, 1946 |
| 2,440,089 | Haeff | Apr. 20, 1948 |
| 2,523,307 | Kandoian | Sept. 26, 1950 |